(12) United States Patent
Mast et al.

(10) Patent No.: US 11,529,744 B2
(45) Date of Patent: Dec. 20, 2022

(54) OPERATING DEVICE FOR A HANDLING DEVICE

(71) Applicant: J. Schmalz GmbH, Glatten (DE)

(72) Inventors: Jonas Mast, Baiersbronn (DE); Dominik Heinzelmann, Freudenstadt (DE); Bernd Heinzmann, Lossburg (DE)

(73) Assignee: J. Schmalz GmbH, Glatten (DE)

( * ) Notice: Subject to any disclaimer, the term of this patent is extended or adjusted under 35 U.S.C. 154(b) by 1126 days.

(21) Appl. No.: 16/137,938

(22) Filed: Sep. 21, 2018

(65) Prior Publication Data

US 2019/0091878 A1  Mar. 28, 2019

(30) Foreign Application Priority Data

Sep. 25, 2017  (DE) .................. 10 2017 122 180.8

(51) Int. Cl.
| | | |
|---|---|---|
| *B25J 15/04* | (2006.01) | |
| *B25J 15/06* | (2006.01) | |
| *B65G 47/91* | (2006.01) | |
| *B25J 1/02* | (2006.01) | |
| *B66C 1/02* | (2006.01) | |
| *B65B 35/18* | (2006.01) | |

(52) U.S. Cl.
CPC ............. *B25J 15/0433* (2013.01); *B25J 1/02* (2013.01); *B25J 15/0483* (2013.01); *B25J 15/0616* (2013.01); *B65B 35/18* (2013.01); *B65G 47/917* (2013.01); *B66C 1/0212* (2013.01); *B66C 1/0256* (2013.01)

(58) Field of Classification Search
CPC .... B25J 15/04; B25J 15/0408; B25J 15/0433; B25J 15/0466; B25J 15/0483; B25J 15/0616; B66C 1/0212; B66C 1/0218; B66C 1/0256; B23Q 3/15546; B65B 35/18; B65G 47/917
See application file for complete search history.

(56) References Cited

U.S. PATENT DOCUMENTS

| | | |
|---|---|---|
| 6,401,007 B1 | 6/2002 | Yablonovitch |
| 2008/0174076 A1 | 7/2008 | Eisele et al. |
| | (Continued) | |

FOREIGN PATENT DOCUMENTS

| | | |
|---|---|---|
| DE | 102005047385 A1 | 4/2007 |
| DE | 102006040034 A1 | 3/2008 |
| | (Continued) | |

OTHER PUBLICATIONS

Translated Office Action from the Japanese Office.
(Continued)

*Primary Examiner* — Dean J Kramer
(74) *Attorney, Agent, or Firm* — George McGuire

(57) ABSTRACT

An operating device for a handling device, with a gripping section and a coupling for a gripping device, with at least a part of the coupling being at or in the gripping section, so that it is rotatable about an axis of rotation, with a reading device for reading out an information carrier with coded data being placed on the side of the griping section facing the coupling, where the reading device is designed to read out an information carrier of a gripping device coupled to the coupling regardless of the rotational position of the coupling.

7 Claims, 4 Drawing Sheets

(56) References Cited

U.S. PATENT DOCUMENTS

| | | | |
|---|---|---|---|
| 2009/0044655 A1* | 2/2009 | DeLouis | B23B 31/113 403/24 |
| 2009/0271036 A1* | 10/2009 | Kock | B25J 9/1666 700/245 |
| 2010/0067981 A1 | 3/2010 | Geyer | |
| 2017/0120454 A1* | 5/2017 | Ferguson | B25J 15/0061 |
| 2018/0311831 A1* | 11/2018 | Guerin | B25J 15/0483 |

FOREIGN PATENT DOCUMENTS

| | | |
|---|---|---|
| DE | 102008028205 B3 | 4/2010 |
| EP | 03135443 A1 | 3/2017 |
| JP | 0356181 A | 3/1991 |
| JP | 09174474 A | 7/1997 |
| WO | 20080133974 A2 | 11/2008 |

OTHER PUBLICATIONS

European Search Report for Application EP 18 19 4807, pp. 1-7, dated Jan. 17, 2019.
German Examination Report for German Application 10 2017 122 180.8, dated Jun. 19, 2018, pp. 1-6.

\* cited by examiner

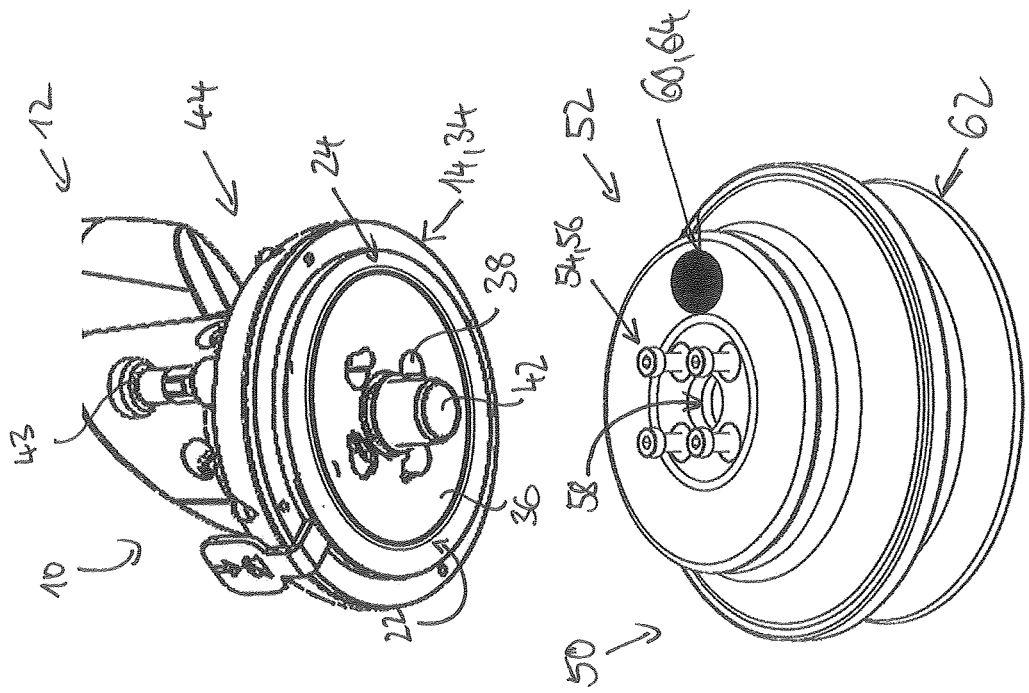
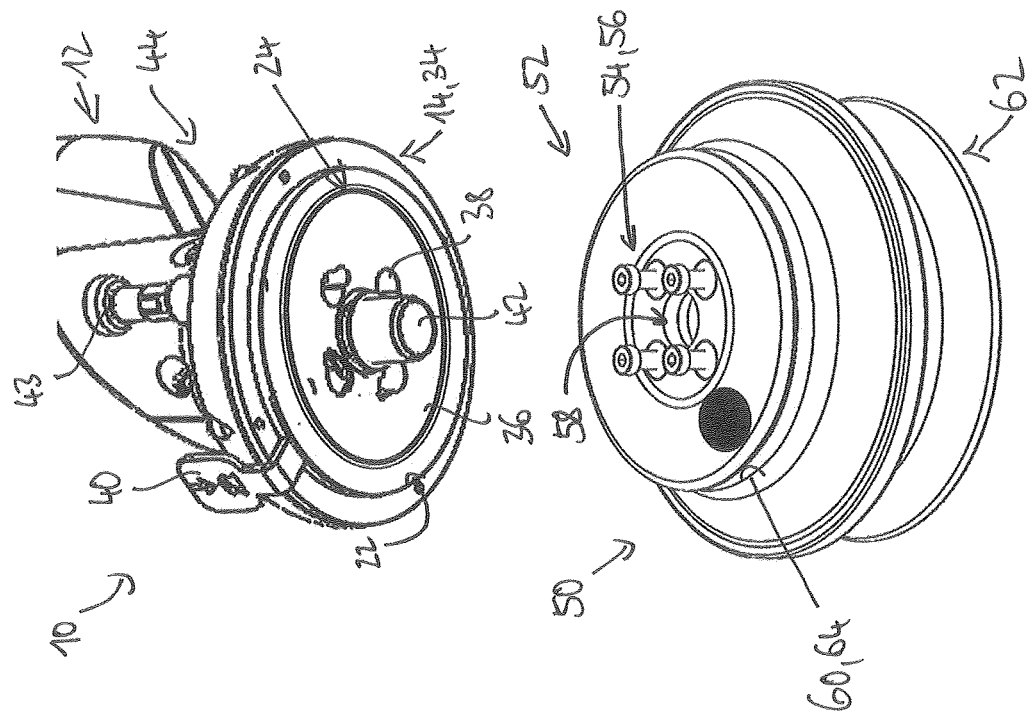
Fig. 5
Fig. 6

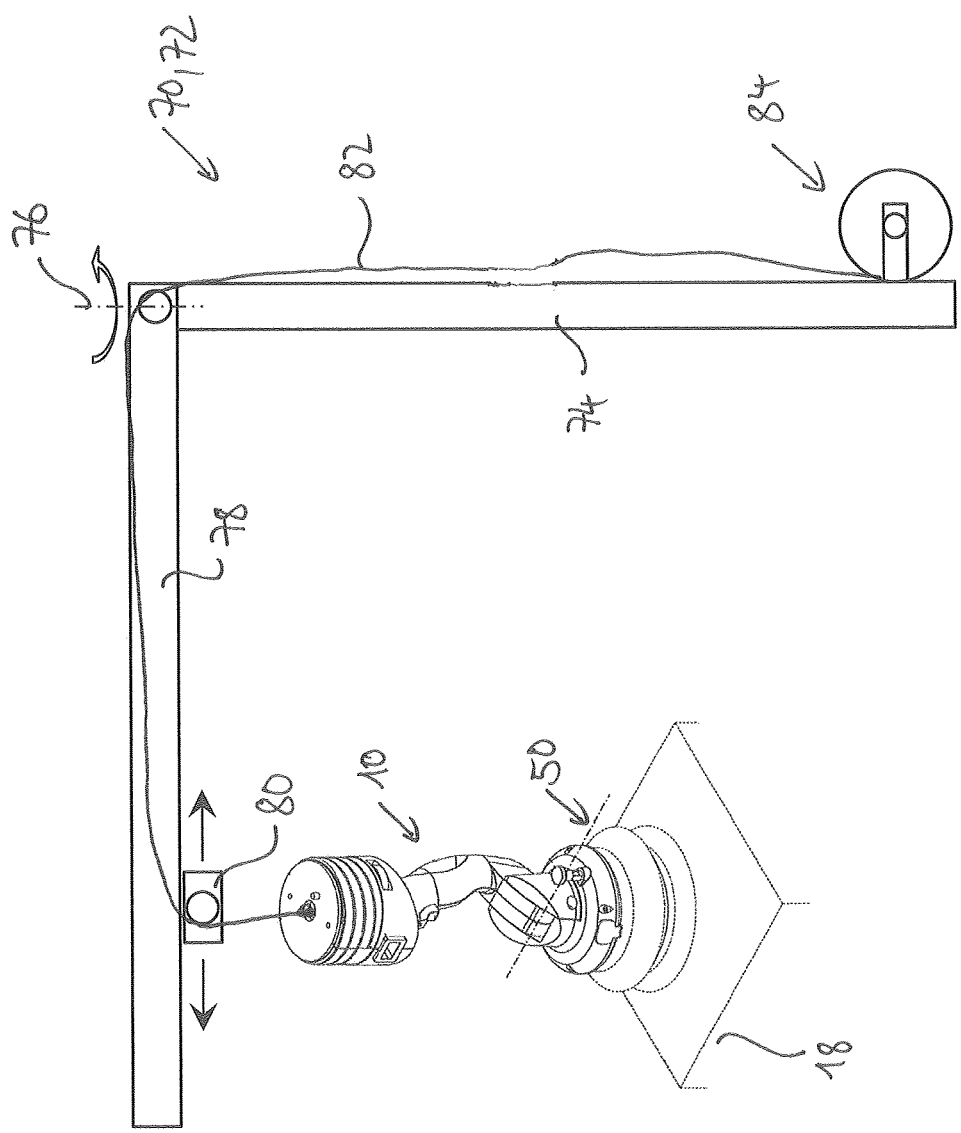

OPERATING DEVICE FOR A HANDLING DEVICE

CROSS-REFERENCE TO RELATED APPLICATIONS

This application claims priority to German patent application No. DE 102017122180.8, filed on Sep. 25, 2017, the entire disclosure of each of which is incorporated herein by reference.

BACKGROUND OF THE INVENTION

The invention concerns an operating device for a handling device, with a gripping section and a coupling for a gripping device for grasping objects, with at least a part of the coupling being configured at or in the gripping section so as to be rotatable about an axis of rotation, so that the coupling can take different rotational positions. The invention furthermore concerns a gripping device for grasping objects, having at least one coupling element for coupling onto a coupling of an operating device on one coupling side of the gripping device. The invention lastly concerns a handling device for handling objects.

An operating device for a handling device of the aforesaid kind is, e.g., known from DE 10 2008 028 205 C5. This operating device enables one-handed operation of a hose jack. Objects to be handled can be gripped with a suction gripper and manoeuvred by the operating device. The simple handling of objects is enabled.

There is however room for optimizations. Different gripping devices can thus be coupled, but not recognized by the operating device, so that objects can be handled with unsuitable gripping devices. The efficient handling of objects, which is reliable for the operator, is therefore not sufficiently assured.

It is the object of this invention to enable the reliable identification of a gripping device that is being used in the handling of objects by simple constructional means. It is desirable for an operator not to expend an extra effort during the handling operation.

SUMMARY OF THE INVENTION

The invention accomplishes the aforesaid task by means of an operating device characterized in that a reading device for reading an information carrier with coded information is installed on the side of the gripping section facing the coupling, with the reading device being configured to read out an information carrier attached to the coupling regardless of the rotational position of the coupling with respect to the gripping section.

It is in this way that a reliable identification of gripping devices by the operating device is made possible, since it is possible to recognize the gripping device independently of its rotational position with respect to the gripping section and thus of the operating device. Continuous identification is thus achieved in practice. Since a gripping device can be recognized during or briefly after coupling a gripping device onto the coupling of the operating device, no additional effort for a controller arises from the identification process. The efficient and safe handling of objects by the operator is made possible by ensuring the correct assignment of the gripping device.

The operating device particularly comprises a control device which cooperates with the reading device. The control device can store a pending task and/or the nature of the objects to be handled, so that a gripping device that is unsuitable for the handling operation can be identified. This can be announced to the operator and/or the coupling of the gripping device to the control mechanism can be prevented.

Because of its rotatable configuration, the coupling can assume different rotational positions in or on the gripping section. The coupling or a part of the coupling, e.g. a coupling plate, can be placed on or in the gripping section so that it is rotatable.

The gripping section can in fact be configured as a control lever. The reading device can be located on the side facing the coupling or it can be integrated in the gripping section, in particular embedded in the latter.

The information carrier contains coded data (code) which can be read out by the reading device. It is by means of these data that copy protection, the correct allocation of parameters, an appraisal of the run time and/or of the wear of the gripping arm can be realized, in particular by means of a control device cooperating with the reading device.

In a preferred embodiment, the reading device can have an antenna for reading out a transponder disposed concentrically with respect to the axis of rotation. This enables a readout to be performed even in difficult ambient conditions, e.g. darkness, dust or contamination, regardless of the rotational position of the gripping device. The readout process takes place wirelessly. The information (code) stored on the transponder can be read out by the antenna.

An RFID transponder can in fact serve as the information carrier. The reading device can be suitable for reading out/inputting to the transponder. The readout/input to the transponder can take place by means of electromagnetic waves. To accomplish this, the reading device can have a communication unit for producing electromagnetic waves. The communication unit can cooperate with the antenna.

The antenna can advantageously be configured as a laminar antenna; the antenna can be circular or the antenna can have several separate sectors. This allows the transponder to be read out/input regardless of the rotational position of the gripping device with respect to the operating device. The laminar antenna can be in the form of a polygon (polygonal), circular or elliptical. The circular antenna can have several windings. The sectors can consist of circular sectors disposed separately with respect to one another.

The reading device can alternatively or additionally be configured as a camera for reading an optical or optoelectronically readable code or it can have such a camera, with the camera being configured to capture an image that is concentric with the axis of rotation. This also enables a continuous identification to be performed by reading the coded information (code). The readout process then takes place optically, with several pieces of information also being transferable. This alternative needs comparatively few components. It is possible to do without an electromagnetic alternating field. This can be of advantage in handling items with electrical or electronic components.

In preferred embodiment, the camera can capture the optical code by means of an optical gap that is concentric with the axis of rotation. This enables the capture of a concentric image recording by simple constructional means. An identification of the gripping device carrying the code can thus take place regardless of the rotational position of the gripping device.

The reading device can, if needed, have a preferably circular lighting element for lighting the optical coding. This enables reliable imaging even under inadequate lighting conditions. The lighting element can be positioned concentrically with respect to the axis of rotation. The lighting element can in particular be a circular light conductor.

The coupling can, in reality, be designed to be a quick-change device. This allows for fast coupling and a fast exchange of gripping devices. The coupling can have intakes that are appropriate for this purpose, e.g. intake openings, a centering element, e.g. a guide pin, and/or a locking element, e.g. a locking plate.

This task is also accomplished by means of a gripping device for grasping objects, with the device having the characteristics of the subordinate claims. The gripping device is characterized in that an information carrier with coded data is located on the side of the coupling.

The information carrier contains coded information (code) that can be read out by the reading device. The information carrier can therefore serve the purpose of identifying the gripping device, so that it is clearly identifiable. The coded data can contain diverse information relating to the gripping device. Information regarding the identity (e.g. serial number), the maximum lifting capacity, the nature of the objects that can be grasped, the number of gripping processes (pick number) and/or the action time of the gripping device is conceivable.

The gripping device can be configured as a suction gripper. The information carrier can be located on the coupling side at the surface of the gripping device or it can be integrated, in particular embedded, in the gripping device.

In a preferred embodiment, the information carrier can be a transponder, in particular an RFID transponder, or an optical or optoelectronically readable code, in particular a bar code, QR code or another optical code in the form of one or two-dimensional code.

The coding can be imprinted on the gripping device or affixed to a label or sticker. The information carrier can store and transfer large amounts of information regarding the gripping device. The transponder can be configured so that it is readable and can be input.

This task is also accomplished by means of a handling device with the characteristics of the subsidiary claims. Reference is made to the handling device and/or to the gripping device regarding the attainable advantages.

The handling device particularly serves as a means of (manually-controlled) handling of objects. The handling device can be configured as a push-pull cable, crane or hose jack.

BRIEF DESCRIPTION OF THE DRAWINGS

The invention is hereinafter described in greater detail based on the figures, with similar or functionally similar components having one and the same reference number. The figures show:

FIG. 5 an example embodiment of a gripping device before coupling to the operating device of FIG. 1, with the gripping device in a first rotational position;

FIG. 6 the gripping device of FIG. 6 in a second rotational position; and

FIG. 7 an example embodiment of a handling device for handling objects in a schematic view.

DETAILED DESCRIPTION

Figure 1:
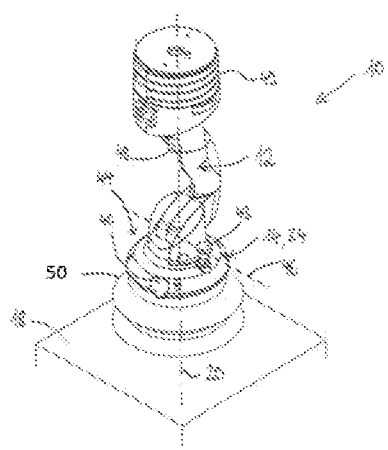
FIG. 1 an example embodiment of an operating device for a handling device.

FIG. 1 shows an operating device for a handling device 70, with the operating device being designated by reference symbols 10.

The operating device 10 has a gripping section 12 in the form of a control lever and a coupling 14 for a gripping device 50 for grasping an object 18. At least a part of the coupling 14 is installed so as to be rotatable about a rotational axis 20 at or in the gripping section 12, in particular rotatable, so that the coupling 14 can assume different rotational positions.

Figure 4:
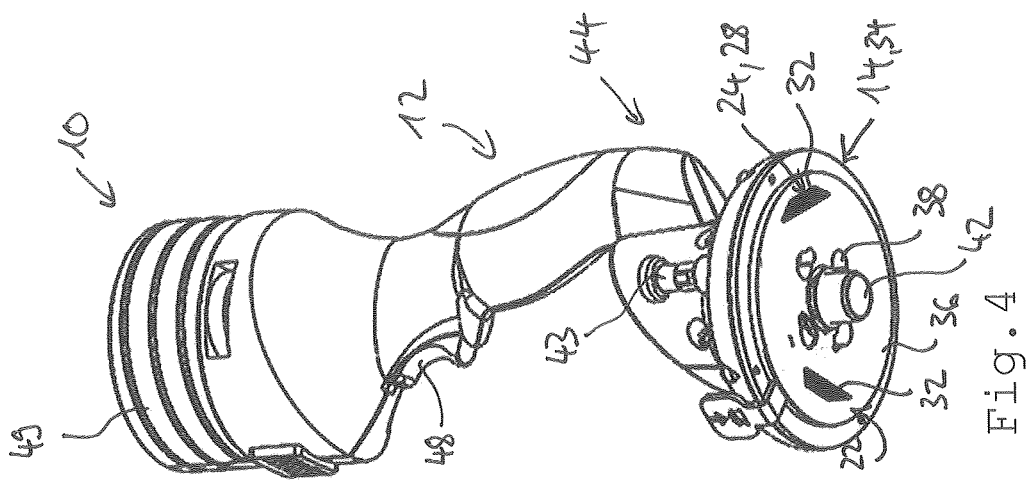
FIG. 4 the operating device of FIG. 1 with an antenna with several segments.
Figure 3:
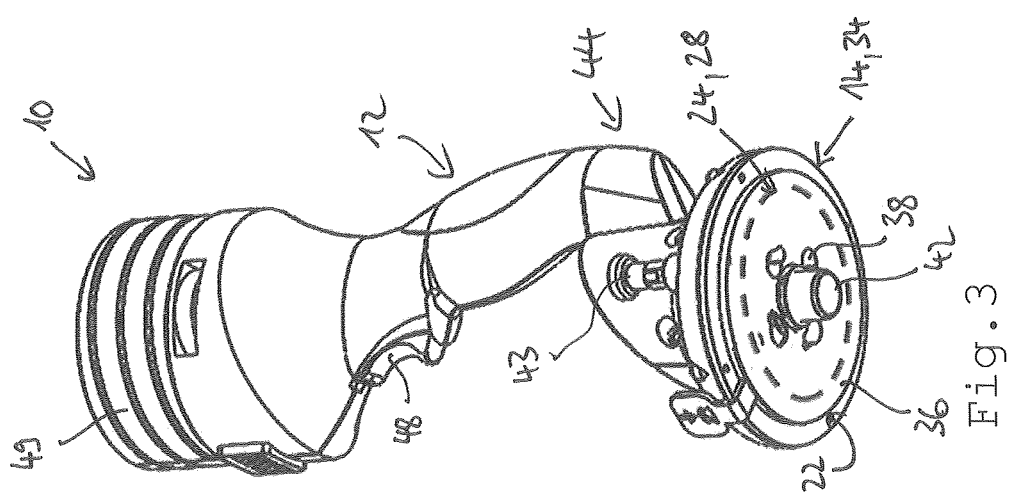
FIG. 3 the operating device of FIG. 1 with a circular antenna.
Figure 2:
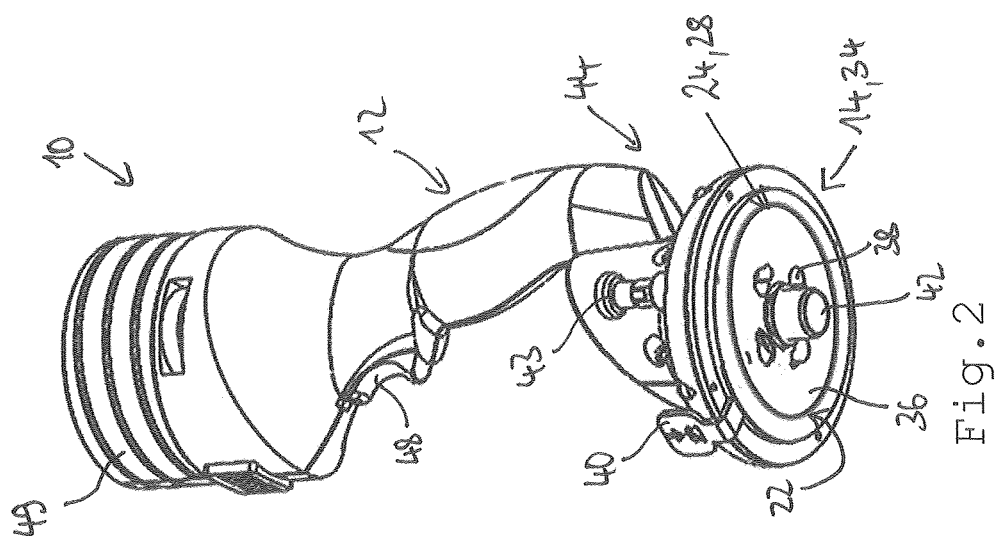
FIG. 2 the operating device of FIG. 1 with a laminar antenna.

A reading device 24 for reading out an information carrier 60, which contains coded data (see FIG. 2 to FIG. 4), is positioned at the side 22 of the coupling 14 facing the gripping section 12. The reading device 24 is designed to read out an information carrier 60 of a gripping device 50 coupled to the coupling 14 regardless of the rotational position of the coupling 14 with respect to the gripping section 12.

The reading device 24 has an antenna 28 in the form of a transponder 64 positioned concentric with the axis of rotation 20 for reading out the information carrier 60. The antenna 28 can be in the form of a laminar antenna with a polygonal, circular or elliptical cross-section (see FIG. 2). The antenna 28 can alternatively be ring shaped, in particular with several windings (see FIG. 3). The antenna 28 can additionally have several separate sectors 32, particularly in the form of several separate circular sectors (see FIG. 4).

The coupling 14 is designed as a quick-change mechanism 34 (see FIGS. 5 and 6). The coupling 14 has a coupling plate 36 with intake openings 38 to which the gripping device 50 can be coupled by way of suitable coupling devices.

A lock plate, which prevents an inadvertent decoupling of the gripping device 50 from the operating device 10, in particular by reaching back to a coupling device, can be operated (not shown) by way of a control latch 40.

A centering pin 42 by means of which the gripping device 50 is centered with respect to the operating device 10 is additionally included. A locking pin 43 allows the coupling plate 36, which is rotatable about the axis of rotation 20 with respect to the gripping section 12, to be blocked in a rotational position.

The coupling section 44 of the operating device 10 accommodating the coupling 14 can be rotated around an axis 46 with respect to the gripping section 12 (see FIG. 1). The gripping section 12 has an operating knob 48 (pull-off) with which the handling device 11 is controllable. The operating device 10 has a connecting device 49 with which the operating device 10 can be connected to a handling device 70, e.g., via a tube lifter or a push-pull cable.

In an embodiment that is not shown, the reading device 24 can be configured as a camera for reading an optical code. In this case, the camera is designed to capture an image that is concentric with the axis of rotation 20. The camera records the optical code through an optical gap that is concentric with the axis of rotation 20. The reading device 24 preferably has a circular lighting device for illuminating the optical coding.

FIGS. 5 and 6 show the gripping device 50 for grasping the object 18. The gripping device 50 is designed as a suction gripper with which an object 18 can be grasped and sticks to the suction gripper due to negative pressure. At least one coupling element 54 for coupling to the coupling 14 of the operating device 10 is placed on one coupling side 52 of the gripping device 50. The coupling element 54 is designed as a locking pin 56.

A centering opening 58, which serves the purpose of receiving the centering pin 42 of the operating device 10, is additionally provided. An object 18 is grasped on the side opposite the coupling side 52 (gripping side 62).

The information carrier 60 containing the coded information is located at the coupling side 52. The coded data contain information about the identity, the maximum lifting capacity, the nature of objects that can be grasped, the number of gripping processes (pick number) and/or the action time of the gripping device.

The information carrier 60 can be a transponder 64, in particular an RFID transponder 64. The transponder 64 can be integrated into the gripping device 50 at the coupling side 52, in particular embedded into the gripping device 50. The transponder 64 can be readable and imputable, in particular by the reading device 24.

In the case of embodiments that are not shown, the information carrier 60 can be an optically or optoelectronically readable code, e.g. a bar code or QR code. Coding can be imprinted on the gripping device 50 or attached on a label or a sticker.

FIG. 7 shows a handling device 70 for handling objects 18. The handling device 70 comprises the described operating device 10. The handling device 70 additionally comprises the described gripping device 50. The gripping device 50 is coupled to the operating device 10.

The handling device 70 is as crane 72 in the present embodiment. The crane 72 has a mast 74 which rotates about an axis 76.

An arm 78 on which a trolley 80 can move is fastened to the mast 74. The operating device 10 is fastened to a cable 82 which cooperates with a cable hoist 84 of the handling device 70.

What is claimed is:

1. Operating device for a handling device, with a gripping section and a coupling for a gripping device, with at least a part of the coupling being located at or in the gripping section, so as to be rotatable about an axis of rotation, so that the coupling can assume different rotational positions, wherein a reading device for reading out an information carrier with coded information is located at the side of the gripping section facing the coupling, with the reading device being configured so as to read an information carrier of a gripping device coupled to the coupling regardless of the rotational position of the coupling, wherein the reading device has an antenna for reading a transponder, where the antenna is positioned so that it is concentric with the axis of rotation.

2. Operating device according to claim 1, characterized in that the antenna is configured as a laminar antenna.

3. Operating device according to claim 1, characterized in that the coupling is configured as a quick-change mechanism.

4. Operating device according to claim 1, characterized in that the antenna is circular.

5. Operating device according to claim 1, characterized in that the antenna has several separate sectors.

6. Handling device for handling objects, with an operating device with a gripping section and a coupling for a gripping device, with at least a part of the coupling being located at or in the gripping section, so as to be rotatable about an axis of rotation, so that the coupling can assume different rotational positions, wherein a reading device for reading out an information carrier with coded information is located at the side of the gripping section facing the coupling, with the reading device being configured so as to read an information carrier of a gripping device coupled to the coupling regardless of the rotational position of the coupling, wherein the reading device has an antenna for reading a transponder, where the antenna is positioned so that it is concentric with the axis of rotation.

7. Handling device according to claim 6, with a gripping device, wherein at least one coupling element for connecting to the coupling of the operating device is located at one coupling side of the gripping device, wherein an information carrier with coded data is located at the coupling side, wherein the information carrier is a transponder.

\* \* \* \* \*